US011243430B2

(12) United States Patent
Mochida

(10) Patent No.: US 11,243,430 B2
(45) Date of Patent: Feb. 8, 2022

(54) LIGHT FLUX CONTROLLING MEMBER, LIGHT-EMITTING DEVICE, SURFACE LIGHT SOURCE DEVICE AND DISPLAY DEVICE

(71) Applicant: Enplas Corporation, Kawaguchi (JP)

(72) Inventor: Toshihiko Mochida, Saitama (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 17/106,423

(22) Filed: Nov. 30, 2020

(65) Prior Publication Data
US 2021/0165278 A1 Jun. 3, 2021

(30) Foreign Application Priority Data

Nov. 29, 2019 (JP) .............................. JP2019-217289

(51) Int. Cl.
*G02F 1/1335* (2006.01)
*F21V 5/04* (2006.01)
*G02F 1/13357* (2006.01)
*F21V 7/00* (2006.01)
*G09G 3/34* (2006.01)

(52) U.S. Cl.
CPC .......... *G02F 1/133607* (2021.01); *F21V 5/04* (2013.01); *F21V 5/045* (2013.01); *F21V 7/0091* (2013.01); *G02F 1/133603* (2013.01); *G02F 1/133606* (2013.01); *F21V 5/046* (2013.01); *G09G 3/3406* (2013.01)

(58) Field of Classification Search
CPC . F21V 5/04; F21V 5/045; F21V 5/046; G02F 1/133607; G09G 3/3406
See application file for complete search history.

(56) References Cited

U.S. PATENT DOCUMENTS

| 7,798,679 B2 * | 9/2010 | Kokubo | F21V 5/048 |
| | | | 362/335 |
| 8,118,457 B2 * | 2/2012 | Kanai | G02B 19/0071 |
| | | | 362/327 |
| 9,484,510 B2 * | 11/2016 | Kim | H01L 33/50 |
| 9,719,656 B2 * | 8/2017 | Lin | G02B 19/0061 |
| 2009/0052192 A1 | 2/2009 | Kokubo et al. | |
| 2015/0260371 A1 * | 9/2015 | Takatori | G02B 19/0047 |
| | | | 362/97.1 |
| 2017/0212386 A1 * | 7/2017 | Fujii | G02F 1/133603 |

FOREIGN PATENT DOCUMENTS

JP 2009-044016 2/2009

* cited by examiner

*Primary Examiner* — Keith G. Delahoussaye
(74) *Attorney, Agent, or Firm* — Amin, Turocy & Watson, LLP

(57) ABSTRACT

A light flux controlling member for controlling a distribution of light emitted from a light-emitting element includes an incidence surface configured to allow the light to enter the light flux controlling member; an emission surface configured to emit light; and a reflection part including an inclined surface configured to reflect light entered from the incidence surface, wherein in a cross-section, a region where light emitted from a light emission center of the light-emitting element that is entered from the incidence surface and sequentially reflected by the emission surface and the inclined surface reaches in the emission surface includes a portion where a derivative value of a gradient of a tangent to a given point in the emission surface is 0, or a portion where a sign of the derivative value reverses.

7 Claims, 12 Drawing Sheets

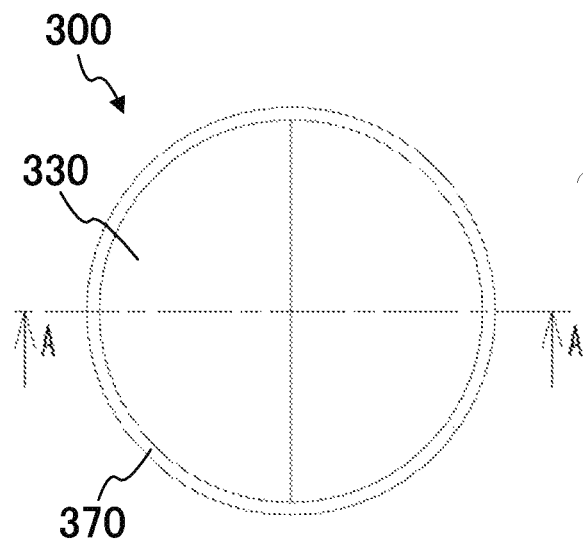
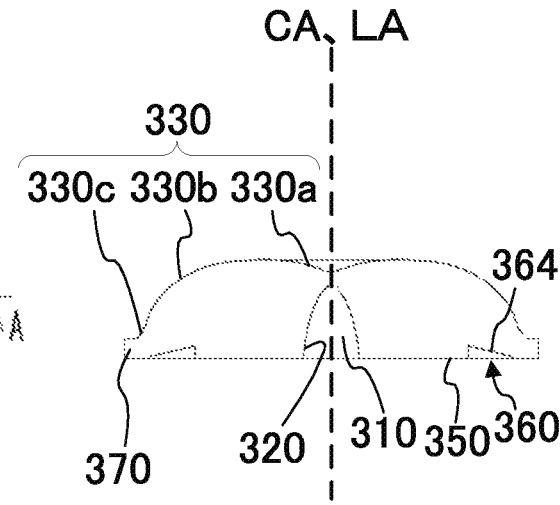
FIG. 5A
FIG. 5B
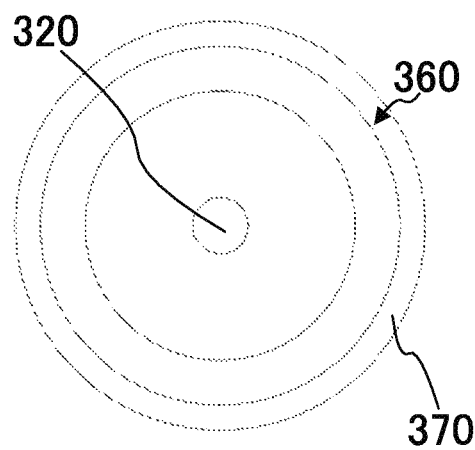
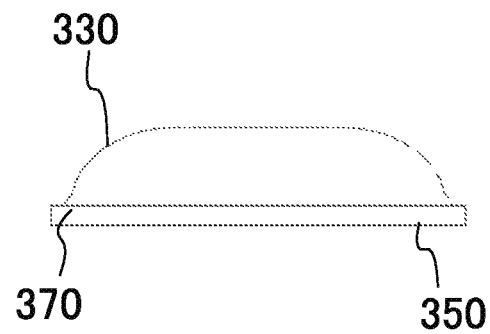
FIG. 5C
FIG. 5D

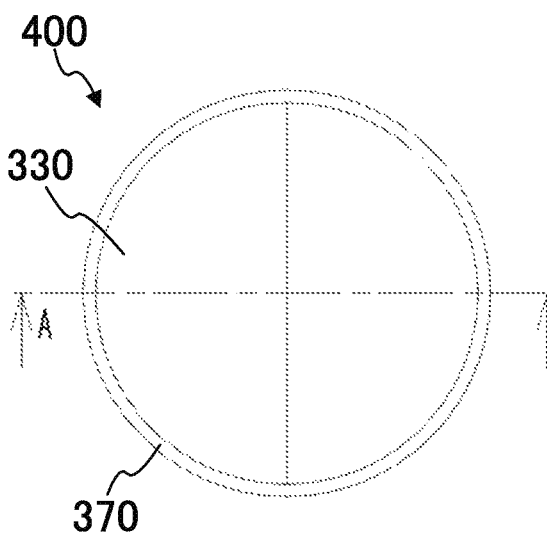
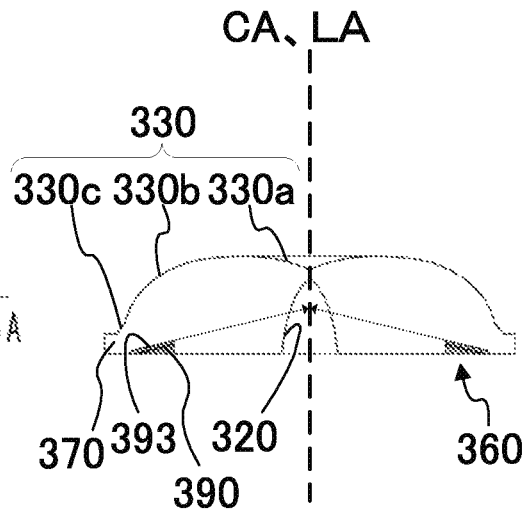
FIG. 6A
FIG. 6B
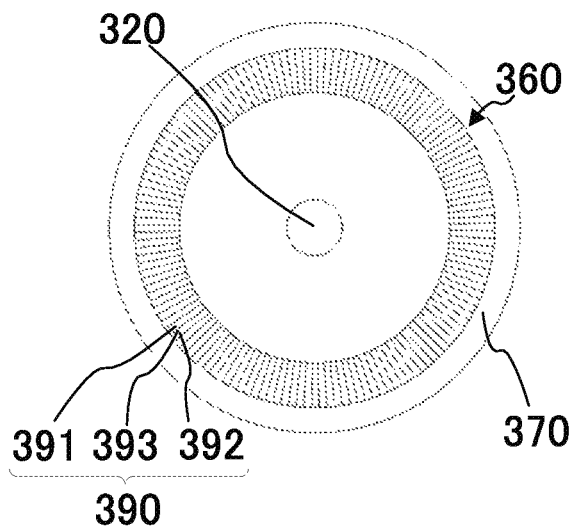
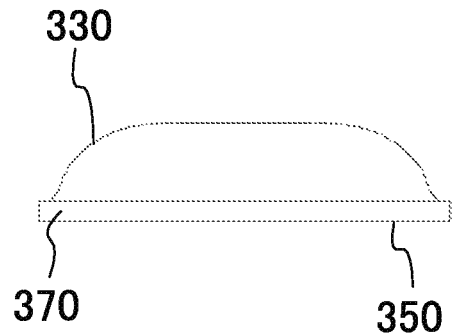
FIG. 6C
FIG. 6D

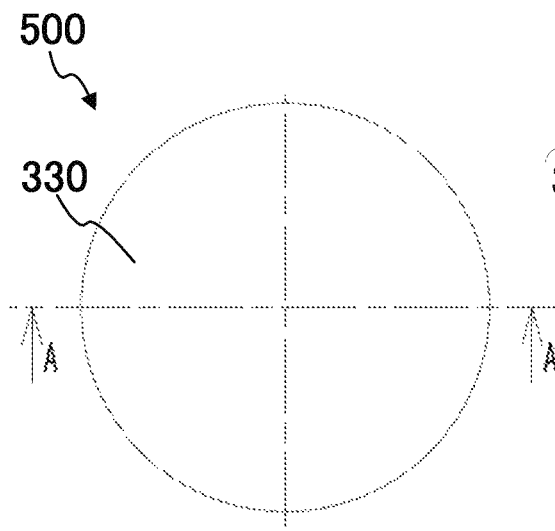
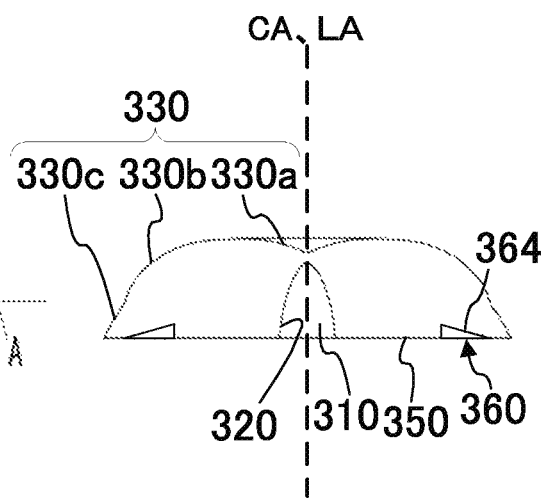
FIG. 9A
FIG. 9B
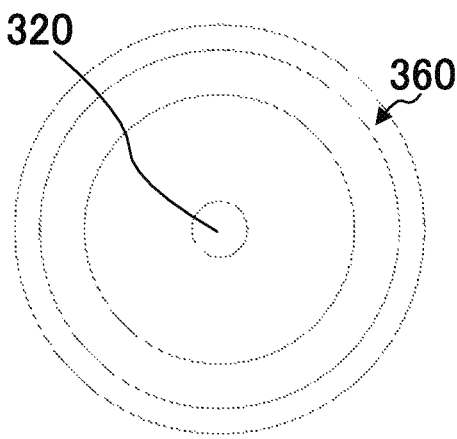
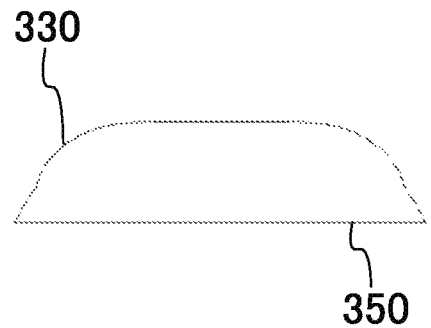
FIG. 9C
FIG. 9D

LIGHT FLUX CONTROLLING MEMBER, LIGHT-EMITTING DEVICE, SURFACE LIGHT SOURCE DEVICE AND DISPLAY DEVICE

CROSS REFERENCE TO RELATED APPLICATIONS

This application is entitled to and claims the benefit of Japanese Patent Application No. 2019-217289, filed on Nov. 29, 2019, the disclosure of which including the specification, drawings and abstract is incorporated herein by reference in its entirety.

TECHNICAL FIELD

The present invention relates to a light flux controlling member configured to control the distribution of light emitted from a light-emitting element. The present invention also relates to a light-emitting device including the light flux controlling member, a surface light source device including the light-emitting device, and a display device including the surface light source device.

BACKGROUND ART

In recent years, a direct surface light source device including a plurality of light-emitting elements as a light source is used in transmission image display devices such as liquid crystal displays.

For example, a direct surface light source device includes a substrate, a plurality of light-emitting elements, a plurality of light flux controlling members (lenses) and a light diffusing member. The plurality of light-emitting elements is disposed in a matrix on the substrate. Light flux controlling member configured to spread, in the surface direction of the substrate, the light emitted from each light-emitting element is disposed on each light-emitting element. The light emitted from the light flux controlling member is spread by the light diffusing member (e.g., a light diffusion plate) to illuminate an illumination target member (e.g., a liquid crystal panel) in a planar fashion.

As disclosed in PTL 1, a known light flux controlling member includes an incidence surface from which light emitted from a light-emitting element enters the member, an emission surface from which the light entered from the incidence surface is emitted to the outside, and a reflecting surface that reflects light Fresnel-reflected by the emission surface.

CITATION LIST

Patent Literature

PTL 1
Japanese Patent Application Laid-Open No. 2009-44016

SUMMARY OF INVENTION

Technical Problem

FIG. 1 illustrates light control in known light flux controlling member 30 as that disclosed in PTL 1. In known light flux controlling member 30, light Fresnel-reflected by emission surface 33 is reflected by reflecting surface 45 toward emission surface 33. As illustrated in FIG. 1, a part of light reflected by reflecting surface 45 can possibly be emitted immediately upward at emission surface 33.

In general, surface light source devices are required to reduce luminance unevenness, and, in recent years, to reduce the thickness of the surface light source device. To reduce luminance unevenness, it is preferable that the light flux controlling member uniformly spreads the light from the light-emitting element in a wide range, and that emission of light travelling immediately upward at the emission surface is reduced. To reduce the thickness of the surface light source device, the thickness of the light flux controlling member is required to be reduced; however, if the thickness of the light flux controlling member is reduced, it is difficult to uniformly spread the light from the light-emitting element over a wide range.

To solve the above-mentioned problems, an object of the embodiment of the present invention is to provide a light flux controlling member that can reduce a situation where the light Fresnel-reflected at an emission surface travels immediately upward even when the thickness of the light flux controlling member has to be reduced.

In addition, another object of the present invention is to provide a light-emitting device, a surface light source device and a display device including the above-mentioned light flux controlling member.

Solution to Problem

A light flux controlling member according to an embodiment of the present invention is configured for controlling a distribution of light emitted from a light-emitting element, the light flux controlling member including: an incidence surface disposed on a rear side of the light flux controlling member to intersect a central axis of the light flux controlling member, the incidence surface being configured to allow the light emitted from the light-emitting element to enter the light flux controlling member; an emission surface disposed on a front side of the light flux controlling member to intersect the central axis, the emission surface being configured to emit light entered from the incidence surface; and a reflection part including an inclined surface disposed on the rear side of the light flux controlling member to surround the incidence surface, the inclined surface being configured to reflect, in a direction away from the central axis, light entered from the incidence surface and Fresnel-reflected by the emission surface, wherein in a cross-section including the central axis of the light flux controlling member, a region where light emitted from a light emission center of the light-emitting element that is entered from the incidence surface and sequentially reflected by the emission surface and the inclined surface reaches in the emission surface includes a portion where a derivative value of a gradient of a tangent to a given point in the emission surface is 0, or a portion where a sign of the derivative value reverses, in a direction from a highest point of the emission surface toward an outer edge of the emission surface.

A light-emitting device according to an embodiment of the present invention includes: a light-emitting element; and the above-mentioned light flux controlling member disposed over the light-emitting element.

A surface light source device according to an embodiment of the present invention includes: the above-mentioned light-emitting device; and a diffusion plate configured to transmit light emitted from the light-emitting device while diffusing the light.

A display device according to an embodiment of the present invention includes: the above-mentioned surface light source device; and a display member configured to be illuminated with light emitted from the surface light source device.

Advantageous Effects of Invention

The present invention can provide a light flux controlling member that can reduce a situation where the light Fresnel-reflected at an emission surface travels immediately upward even when the thickness of the light flux controlling member has to be reduced, and a light-emitting device, a surface light source device and a display device including the light flux controlling member.

BRIEF DESCRIPTION OF DRAWINGS

FIGS. 5A to 5D illustrate a configuration of a light flux controlling member according to Embodiment 1;

FIGS. 6A to 6D illustrate a configuration of the light flux controlling member according to Embodiment 1 in a case where a plurality of ridges is provided in a rear inclined surface;

FIGS. 9A to 9D illustrate a configuration of a light flux controlling member according to Embodiment 2;

DESCRIPTION OF EMBODIMENTS

An embodiment of the present invention is elaborated below with reference to the accompanying drawings. In the following description, as a typical example of a surface light source device of an embodiment of the present invention, a surface light source device suitable for a backlight of a liquid crystal display is described. Such surface light source device 100 may be used as display device 100' (see FIG. 2B) when used with display member (an illumination target member) 102 (e.g., a liquid crystal panel) configured to be illuminated with light from the surface light source device.

Embodiment 1

Configurations of Surface Light Source Device and Light-Emitting Device

Figure 2A:
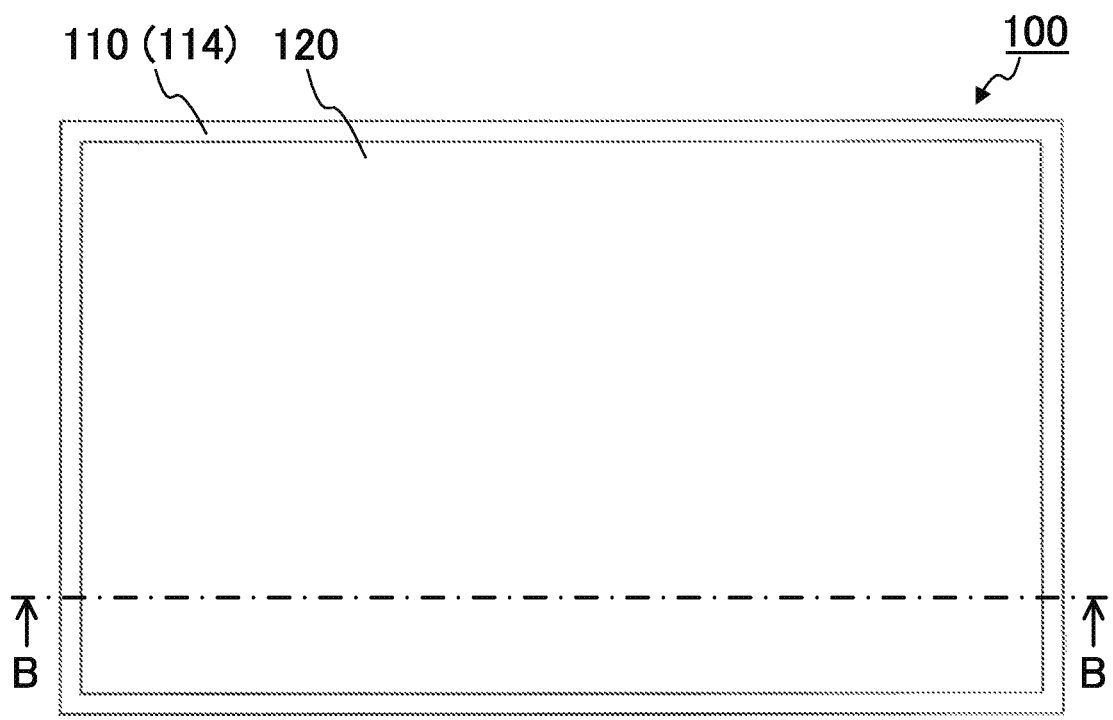
FIGS. 2A and 2B illustrate a configuration of a surface light source device according to Embodiment 1.
Figure 2B:
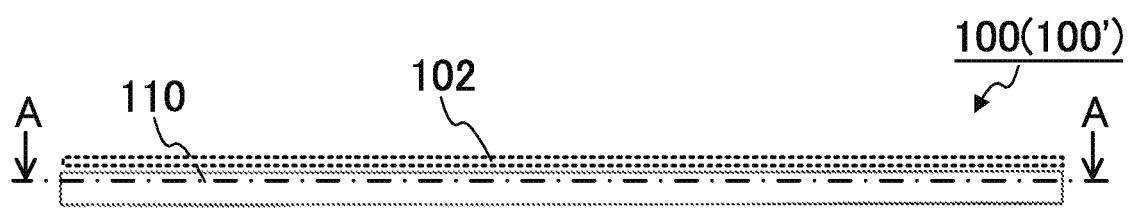
Figure 3A:
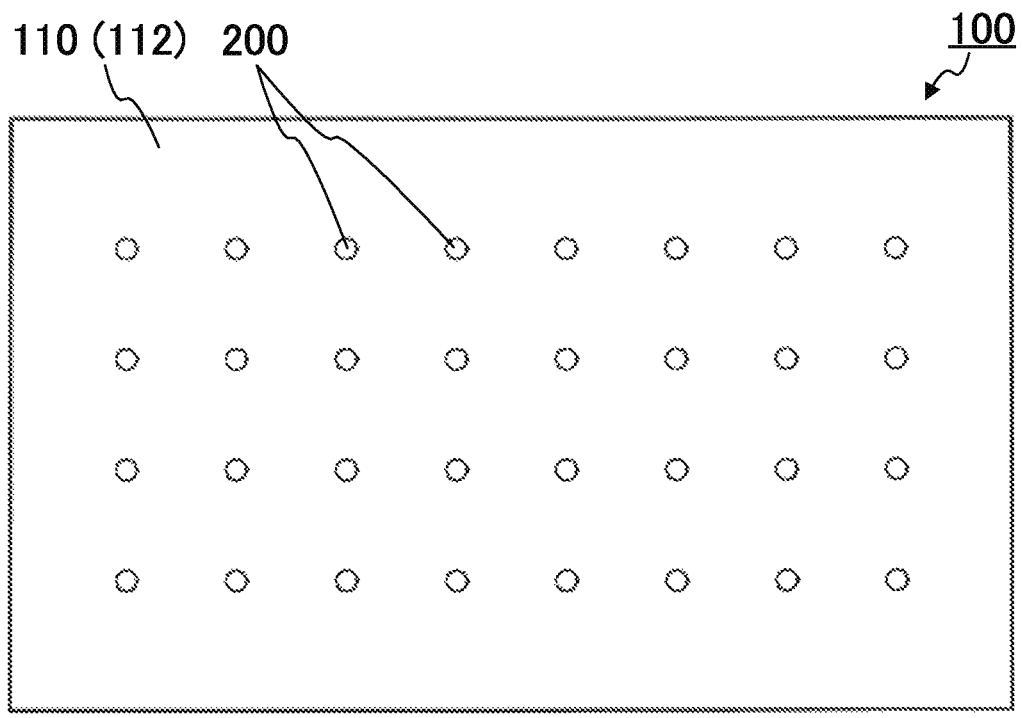
FIGS. 3A and 3B are sectional views illustrating a configuration of the surface light source device according to Embodiment 1.
Figure 3B:
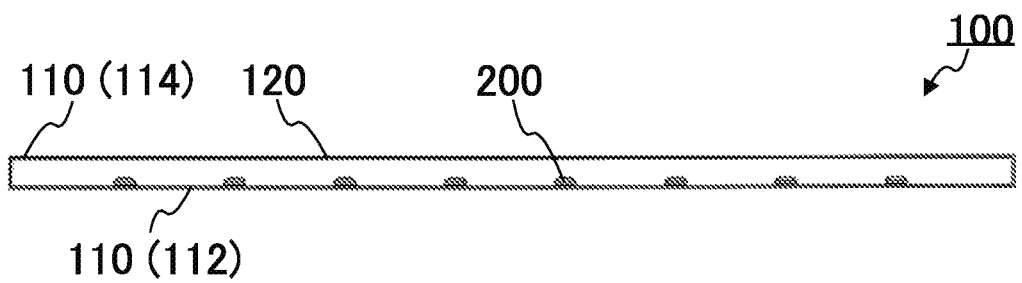
Figure 4:
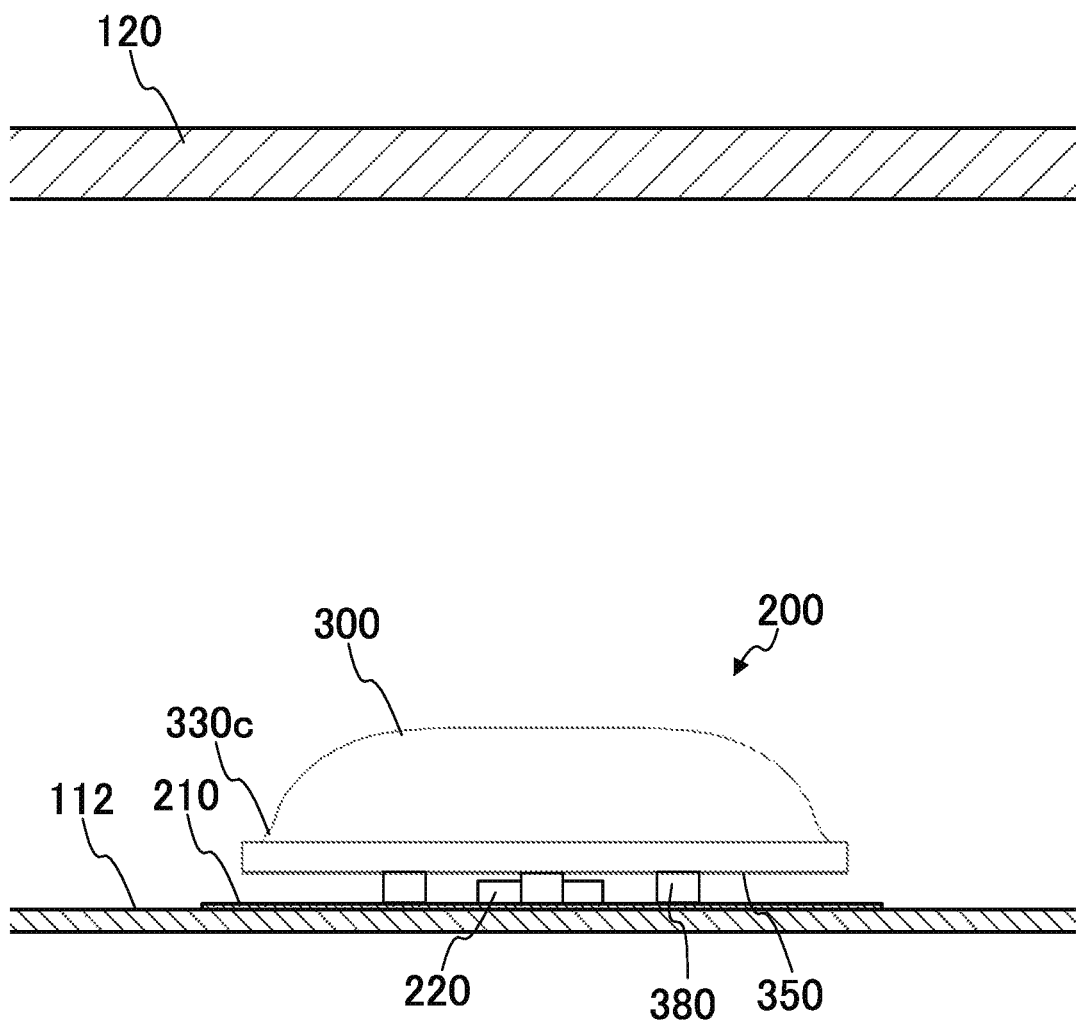
FIG. 4 is a partially enlarged sectional view of FIG. 3B.

FIGS. 2A to 4 illustrate a configuration of a surface light source device according to the embodiment. FIG. 2A is a plan view and FIG. 2B is a front view. FIG. 3A is a sectional view taken along line A-A of FIG. 2B, and FIG. 3B is a sectional view taken along line B-B of FIG. 2A. FIG. 4 is a partially enlarged sectional view of FIG. 3B.

As illustrated in FIGS. 2 and 3, surface light source device 100 according to the embodiment includes housing 110, a plurality of light-emitting devices 200 and light diffusing member 120. The plurality of light-emitting devices 200 is disposed in a matrix on bottom plate 112 of housing 110. The inner surface of bottom plate 112 functions as a diffusive reflection surface. In addition, an opening is provided in top plate 114 of housing 110. Light diffusing member 120 is disposed to close the opening, and functions as a light-emitting surface. The size of light-emitting surface is, but not limited to, approximately 400 mm×approximately 700 mm, for example.

As illustrated in FIG. 4, each light-emitting device 200 is fixed on substrate 210. A plurality of substrates 210 is fixed at predetermined positions on bottom plate 112 of housing 110. Each light-emitting device 200 includes light-emitting element 220 and light flux controlling member 300.

Light-emitting element 220 is a light source of surface light source device 100, and is mounted on substrate 210. Light-emitting element 220 is a light-emitting diode (LED) such as a white light-emitting diode, for example. In addition, while the type of light-emitting element 220 is not limited, a light-emitting element (e.g., a COB light-emitting diode) that emits light from the top surface and the side surface or the like is favorably used for the light-emitting device according to the embodiment of the present invention.

Light flux controlling member 300 is a diffusion lens that controls the distribution of light emitted from light-emitting element 220, and is fixed on substrate 210. Light flux controlling member 300 is disposed on light-emitting element 220 such that central axis CA thereof coincides with light axis LA of light-emitting element 220. Note that both incidence surface 320 and emission surface 330 of light flux controlling member 300 described later are rotationally symmetrical (in the present embodiment, circularly symmetrical), and their rotation axes coincide with each other. The rotation axes of incidence surface 320 and emission surface 330 are referred to as "central axis CA of light flux controlling member". In addition, "light axis LA of light-emitting element" means a central light beam of a stereoscopic emission light flux from light-emitting element 220. A gap for dissipating the heat generated from light-emitting element 220 to the outside is formed between substrate 210 where light-emitting element 220 is mounted and rear surface 350 of light flux controlling member 300.

Light flux controlling member 300 is formed by integral molding. The material of light flux controlling member 300 is not limited as long as light of a desired wavelength can pass therethrough. Examples of the material of light flux controlling member 300 include optically transparent resins such as polymethylmethacrylate (PMMA), polycarbonate (PC) and epoxy resin (EP), and glass.

A main feature of surface light source device 100 according to the present embodiment is the configuration of light flux controlling member 300. Therefore, light flux controlling member 300 will be elaborated later.

Light diffusing member 120 is a plate-shaped member having a light diffusing property, and transmits light emitted from light-emitting device 200 while diffusing the light. Normally, light diffusing member 120 has substantially the same size as the illumination target member such as a liquid crystal panel. For example, light diffusing member 120 is composed of an optically transparent resin such as polymethylmethacrylate (PMMA), polycarbonate (PC), polystyrene (PS), and styrene methyl methacrylate copolymerization resin (MS). To provide the light diffusing property, minute irregularities are formed in the surface of light diffusing member 120, or light diffusers such as beads are dispersed in light diffusing member 120.

In surface light source device 100 according to the present embodiment, light emitted from each light-emitting element 220 is spread by light flux controlling member 300 to illuminate a wide range of light diffusing member 120. Light emitted from each light flux controlling member 300 is further diffused by light diffusing member 120. As a result, surface light source device 100 according to the present embodiment uniformly illuminates the planar illumination target member (e.g., a liquid crystal panel).

Configuration of Light Flux Controlling Member

FIGS. 5A to 5D illustrate a configuration of light flux controlling member 300 according to Embodiment 1. FIG. 5A is a plan view, FIG. 5B is a sectional view taken along line A-A of FIG. 5A, FIG. 5C is a bottom view, and FIG. 5D is a front view. In FIG. 5B, hatching is omitted.

As illustrated in FIGS. 5A to 5D, light flux controlling member 300 includes recess 310, incidence surface 320, emission surface 330, rear surface 350, reflection part 360 and flange part 370.

Recess 310 is formed at a center portion on the rear side (light-emitting element 220 side) of light flux controlling member 300. The inner surface of recess 310 functions as incidence surface 320. Incidence surface 320 allows the majority of light emitted from light-emitting element 220 (see FIG. 4) to enter light flux controlling member 300 while controlling the travelling direction of the light. As such, light flux controlling member 300 is disposed such that incidence surface 320 faces light-emitting element 220. Incidence surface 320 intersects central axis CA of light flux controlling member 300, and is rotationally symmetrical (circularly symmetrical) about central axis CA. For example, the shape of recess 310 is, but not limited thereto, a prolate hemispheroid (obtained by halving, along the minor axis, a spheroid formed around the longitudinal axis of an ellipse).

Emission surface 330 is formed on the front side (light diffusing member 120 side) of light flux controlling member 300 to protrude from flange part 370 and intersect the central axis of light flux controlling member 300. Emission surface 330 emits, to the outside, light having entered light flux controlling member 300 while controlling the travelling direction of the light. Emission surface 330 is rotationally symmetrical (circularly symmetrical) about central axis CA.

In the present embodiment, on the front side of light flux controlling member 300, emission surface 330 includes first emission surface 330a disposed in a predetermined range around central axis CA (a region around central axis CA), second emission surface 330b disposed to surround first emission surface 330a, and third emission surface 330c disposed to surround second emission surface 330b (see FIG. 5B). While first emission surface 330a is a smooth curved surface recessed with respect to light diffusing member 120 and second emission surface 330b is a smooth curved surface raised with respect to light diffusing member 120 in the present embodiment, the shapes of first emission surface 330a and second emission surface 330b are not limited thereto. In the present embodiment, third emission surface 330c is located at the outer periphery portion of emission surface 330, and smoothly connects second emission surface 330b and the top surface of flange part 370. The shape of third emission surface 330c will be described later.

Rear surface 350 is a flat surface disposed to extend in a radial direction (a direction perpendicular to central axis CA) from the opening end portion of recess 310 on the rear side of light flux controlling member 300. Rear surface 350 allows, to enter light flux controlling member 300, the light emitted from light-emitting element 220 that has not been entered from incidence surface 320.

On the rear side of light flux controlling member 300, reflection part 360 includes inclined surface 364 disposed to surround incidence surface 320 (recess 310) and configured to reflect light emitted from light-emitting element 220 that is Fresnel-reflected by light emission surface 330 (see FIG. 5B). In the present embodiment, reflection part 360 is an annular groove formed in a substantially V-shape in the cross section including central axis CA (see FIG. 5B). The inner surface of the two surfaces of the V shape is approximately parallel to central axis CA, whereas the outer surface thereof is inclined surface 364 tilted to central axis CA by a predetermined angle (e.g., 30°). Inclined surface 364 of reflection part 360 reflects, in a direction away from central axis CA, light having been entered from incidence surface 320 and Fresnel reflected by emission surface 330. As such, inclined surface 364 is tilted such that the closer inclined surface 364 is to central axis CA, the closer inclined surface 364 is to the front side.

While the position of reflection part 360 is not limited, reflection part 360 is preferably located at a region where a large amount of light emitted from the light emission center of light-emitting element 220 that is entered from incidence surface 310 and Fresnel-reflected at emission surface 330 (mainly first emission surface 330a and second emission surface 330b) reaches. Preferably, reflection part 360 is disposed at a position on the outer side than the highest point (a position separated from central axis CA) in light flux controlling member 300.

From the viewpoint of improving the reflectivity of light arriving from emission surface 330, a plurality of ridges 390 (total reflection prism) may be formed in the above-described inclined surface 364. FIGS. 6A to 6D illustrate a configuration of light flux controlling member 400 according to Modification 1 including the plurality of ridges 390. FIG. 6A is a plan view, FIG. 6B is a sectional view taken along line A-A of FIG. 6A, FIG. 6C is a bottom view, and FIG. 6D is a front view. In FIG. 6B, hatching is omitted. Note that, in Modification 1, the components same as those of Embodiment 1 are denoted with the same reference numerals and the description thereof is omitted.

In a bottom view, the plurality of ridges 390 is disposed radially (rotationally symmetrically) with respect to central axis CA of light flux controlling member 400. As illustrated in FIG. 6C, each ridge 390 includes flat first inclined surface 391, flat second inclined surface 392, and ridgeline 393 that is an intersection line between first inclined surface 391 and second inclined surface 392, and functions as a total reflection prism. As illustrated in FIG. 6B, a virtual line including ridgeline 393 of ridge 390 intersects central axis CA at a position on the front side (light diffusing member 120 side) than ridgeline 393. Specifically, each ridge 390 is tilted with respect to central axis CA by a predetermined angle (e.g., 30°) such that the front side (light diffusing member 120 side) is closer to central axis CA than the rear side (light-emitting element 220 side). The light having reached reflection part 360 is sequentially reflected at two surfaces (first inclined surface 391 and second inclined surface 392) of any of ridges 390, and is thus directed toward emission surface 330 (mainly, third emission surface 330c).

Flange part 370 is disposed between the outer edge of emission surface 330 (third emission surface 330c) and the outer edge of rear surface 350, and extended in a direction away from central axis CA. Flange part 370 has a substantially annular shape. With flange part 370, handling and alignment of light flux controlling member 300 are facilitated. The thickness of flange part 370 is not limited, and is determined in consideration of the required area of emission surface 330, the workability of flange part 370 and the like.

Light flux controlling member 300 may include a plurality of leg parts 380 (see FIG. 4). The plurality of leg parts 380 is members each of which has a substantially columnar shape protruding from rear surface 350. The plurality of leg parts 380 supports light flux controlling member 300 at an appropriate position with respect to light-emitting element 220.

Now the shape of third emission surface 330c disposed at the outer periphery portion of emission surface 330 is described. In a cross-section of light flux controlling member 300 including central axis CA (see FIG. 5B and FIG. 6B), third emission surface 330c is disposed in a region where light that is emitted from the light emission center of light-emitting element 220 and entered from incidence surface 320 so as to be sequentially reflected by emission surface 330 and inclined surface 364 reaches. Third emission surface 330c is configured such that light arriving from inclined surface 364 does not travel to the part immediately above light flux controlling member 300. To be more specific, in a cross-section of light flux controlling member 300 including central axis CA (see FIG. 5B and FIG. 6B), third emission surface 330c includes a portion where the derivative value of the gradient of the tangent to a given point in emission surface 330 is 0, or a portion where the sign of the derivative value reverses, in the direction from the highest point in emission surface 330 toward the outer edge of emission surface 330.

Figure 7:
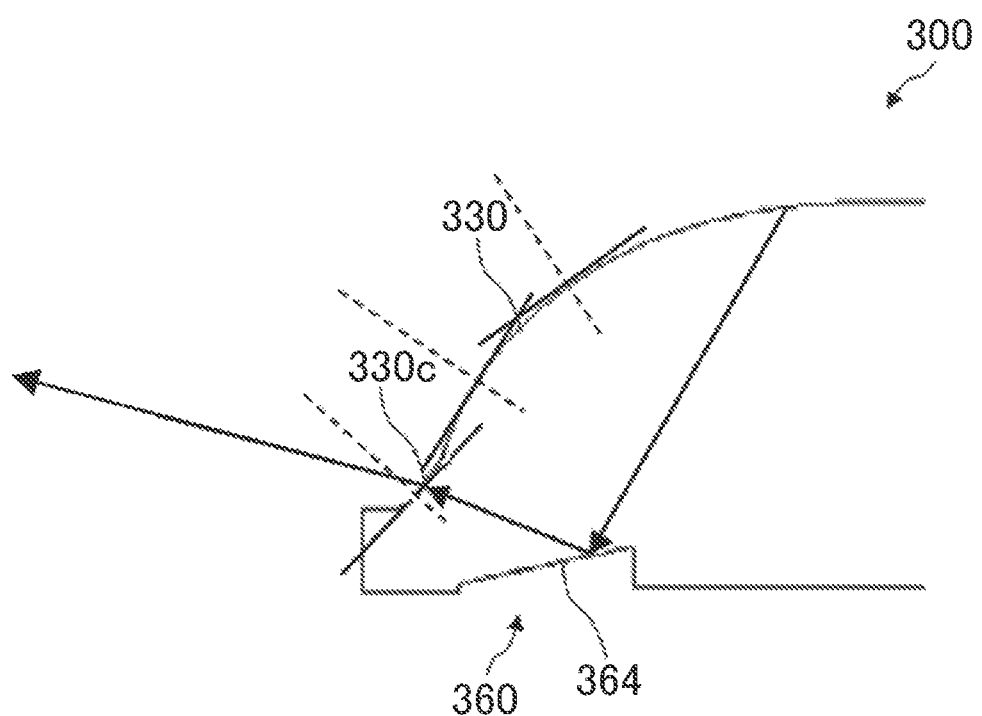
FIG. 7 is a diagram for describing a shape of an emission surface in the light flux controlling member according to Embodiment 1.

FIG. 7 is a diagram for describing a cross-sectional shape of the above-mentioned emission surface 330. As illustrated in FIG. 7, light Fresnel-reflected by emission surface 330 is reflected by inclined surface 364 of reflection part 360 so as to reach emission surface 330 (third emission surface 330c). Here, as illustrated in FIG. 7, in the upper region of emission surface 330 (upper parts of second emission surface 330b and third emission surface 330c), the gradient of the tangent to emission surface 330 gradually increases from the highest point in emission surface 330 toward the outer edge of emission surface 330. That is, in this region, the derivative value of the gradient of the tangent is positive.

On the other hand, as illustrated in FIG. 7, in the lower region of emission surface 330 (a lower part of third emission surface 330c), the gradient of the tangent to emission surface 330 gradually decreases from the highest point in emission surface 330 toward the outer edge of emission surface 330. That is, in this region, the derivative value of the gradient of the tangent is negative. As described above, emission surface 330 where light reflected by inclined surface 364 reaches includes a region where the sign of the derivative value of the gradient of the tangent to a given point in emission surface 330 reverses in the direction from the highest point in emission surface 330 toward the outer edge of emission surface 330. When the region (third emission surface 330c) where the sign of the derivative value of the gradient of the tangent to emission surface 330 reverses is provided, the light having reached emission surface 330 (third emission surface 330c) from inclined surface 364 of reflection part 360 is emitted in a direction close to the horizontal direction as illustrated in FIG. 7. Note that while FIG. 7 illustrates the left portion of the sectional view of light flux controlling member 300, the sign is opposite in the right portion. However, also on the right side in the sectional view, emission surface 330 (third emission surface 330c) includes a region where the sign of the derivative value of the gradient of the tangent reverses.

In addition, while a case where the sign of the derivative value of the gradient of the tangent reverses is described above, emission surface 330 may include a region where the derivative value of the gradient of the tangent is 0. The region where the derivative value of the gradient of the tangent is 0 means that the gradient of the tangent does not change, and that a region where the cross-sectional shape of emission surface 330 is a straight line is included.

Illuminance Distribution in Surface Light Source Device

Figure 1:
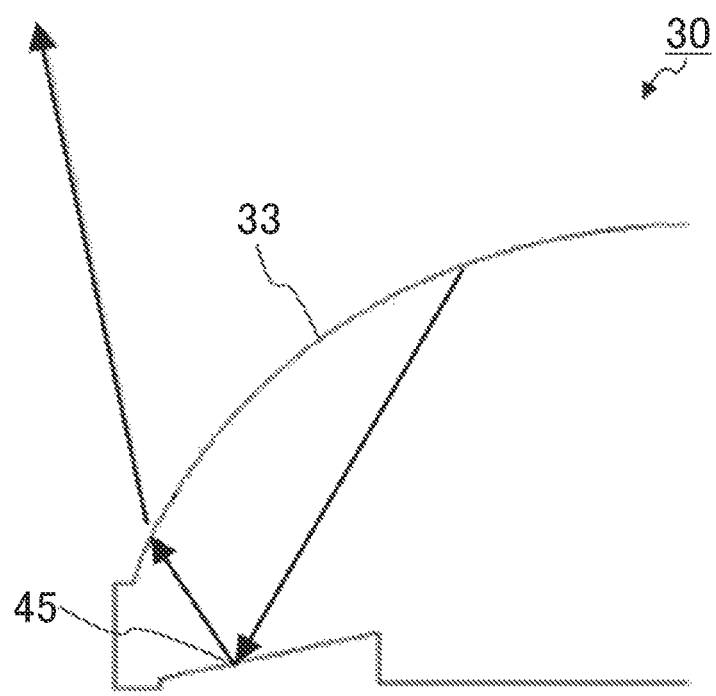
FIG. 1 illustrates light control in a known light flux controlling member.

With a light-emitting device including light flux controlling member 300 according to Embodiment 1 illustrated in FIG. 5, the illuminance distribution over light diffusing member 120 was measured. In addition, for comparison, the illuminance distribution over light diffusing member 120 was measured also with a light-emitting device including the known light flux controlling member 30 illustrated in FIG. 1 (in which a third emission surface including a region where the sign of the derivative value of the gradient of the tangent reverses is not provided).

In the present measurement, the parameters were set as follows.

Parameters

The length of each side of the light-emitting surface of light-emitting element 220: approximately 0.9 mm (diagonal length: approximately 1.3 mm)

The outer diameter of light flux controlling member 300: ϕ13 mm

Figure 8A:
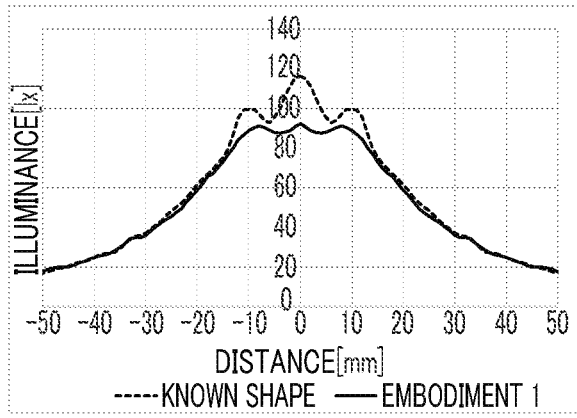
FIGS. 8A to 8F show results of a measurement of an illuminance distribution in one light-emitting device of the surface light source device according to Embodiment 1.
Figure 8B:
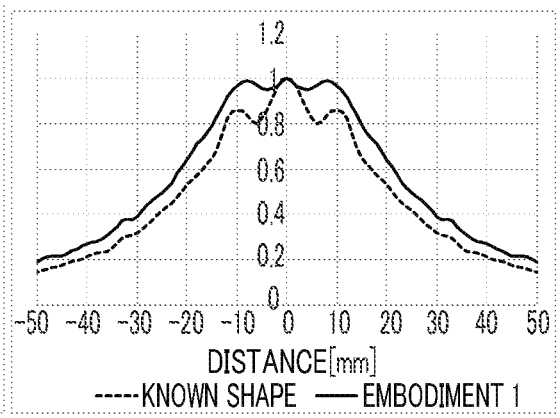

The diameter of the opening of recess 310 serving as incidence surface 320: ϕ4 mm The distance (optical distance OD) between light flux controlling member 300 and light diffusing member 120: approximately 3.6 mm FIGS. 8A to 8F show results of the measurement. The abscissa indicates the distance from central axis CA of the light flux controlling member (light axis LA), and the ordinate indicates the illuminance FIG. 8A shows the illuminance distribution under the above-mentioned conditions. FIG. 8B shows a result of normalization for setting the illuminance to 1 in the case where the distance is 0 mm in the measurement result of FIG. 8A.

FIG. 8A shows that comparing the known light flux controlling member 30 with light flux controlling member 300 according to Embodiment 1, light flux controlling member 300 according to Embodiment 1 has a lower illuminance of the region around the part immediately above the light flux controlling member. In addition, FIG. 8B shows that comparing the known light flux controlling member 30 with light flux controlling member 300 according to Embodiment 1, light flux controlling member 300 according to Embodiment 1 has a more spread half-width of the illuminance, thus more significantly spreading the light.

Figure 8C:
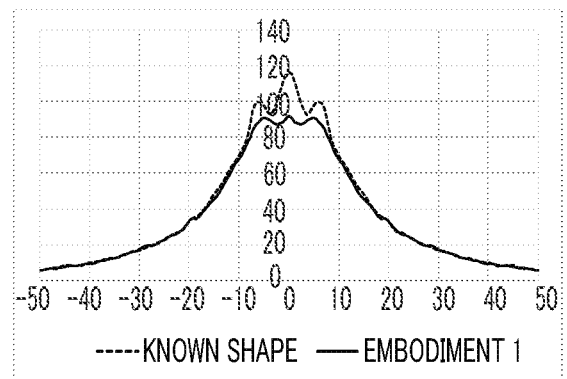
Figure 8D:
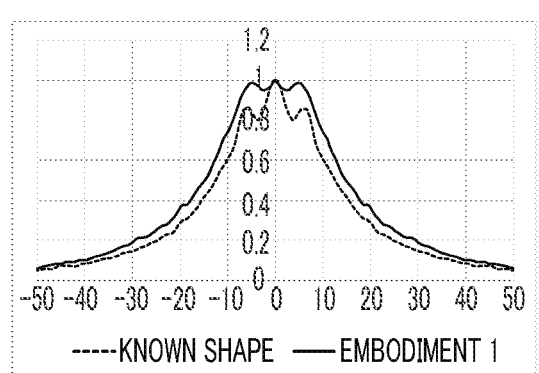
Figure 8E:
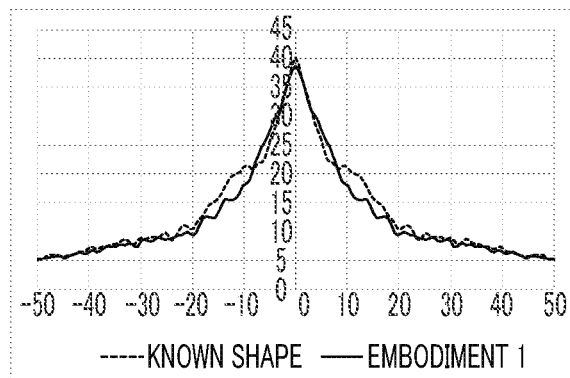
Figure 8F:
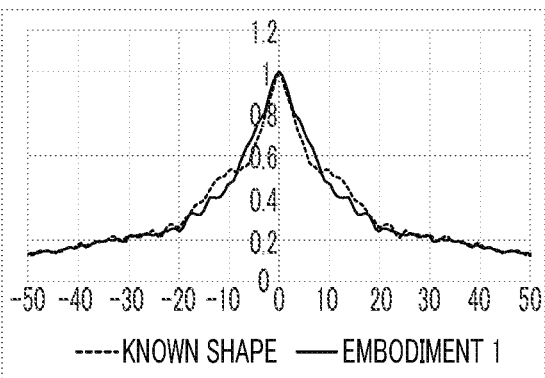

FIGS. 8C and 8D show the illuminance distribution when the optical distance is changed to 3.5 mm under the above-mentioned conditions, and FIGS. 8E and 8F show the illuminance distribution when the optical distance is changed to 10 mm under the above-mentioned conditions.

FIG. 8D shows a result of normalization for setting the illuminance to 1 in the case where the distance is 0 mm in the measurement result of FIG. 8C. FIG. 8F shows a result of normalization for setting the illuminance to 1 in the case where the distance is 0 mm in the measurement result of FIG. 8E.

As is clear from comparison between FIG. 8C and FIG. 8E, the difference in the result between known light flux controlling member 30 and light flux controlling member 300 according to Embodiment 1 was more significant in FIG. 8C and FIG. 8D in which the optical distance is as short as 3.5 mm, than in FIG. 8E and FIG. 8F in which the optical distance is as long as 10 mm Thus it was shown that the smaller the optical distance, the greater the light spreading effect achieved by light flux controlling member 300 according to the present embodiment. That is, light flux controlling member 300 according to Embodiment 1 is especially suitable for a thin surface light source device.

Embodiment 2

Configurations of Surface Light Source Device and Light-Emitting Device

A surface light source device and a light-emitting device according to Embodiment 2 differs in that light flux controlling member 500 according to Embodiment 2 is provided in place of light flux controlling member 300 according to Embodiment 1. In view of this, in the present embodiment, only light flux controlling member 500 according to Embodiment 2 is described.

Configuration of Light Flux Controlling Member

FIGS. 9A to 9D illustrate a configuration of light flux controlling member 500 according to Embodiment 2. FIG. 9A is a plan view, FIG. 9B is a sectional view taken along line A-A of FIG. 9A, FIG. 9C is a bottom view, and FIG. 9D is a front view. In FIG. 9B, hatching is omitted.

Light flux controlling member 500 according to Embodiment 2 differs from light flux controlling member 300 according to Embodiment 1 only in that emission surface 330 and rear surface 350 are connected to each other, and that flange part 370 is not provided. In view of this, the same components as those of Embodiment 1 are denoted by the same reference numerals and the description thereof is omitted. Here, the configuration in which the emission surface and the rear surface are connected to each other means another part such as a flange is not provided between the emission surface and the rear surface.

Figure 10A:
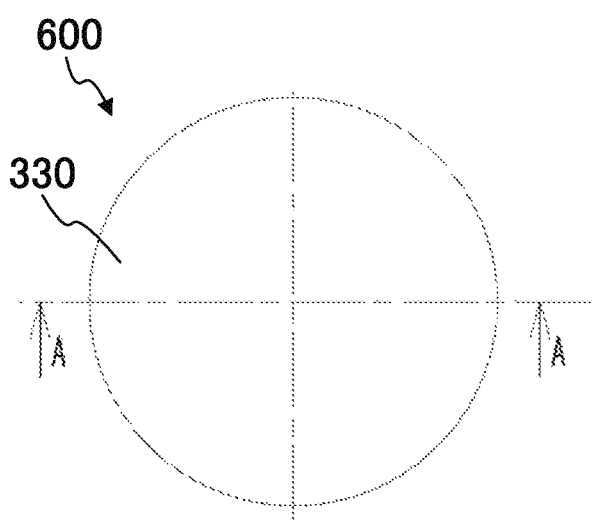
FIGS. 10A to 10D illustrate a configuration of a case where a plurality of ridges is provided in a rear inclined surface in the light flux controlling member according to Embodiment 2.
Figure 10B:
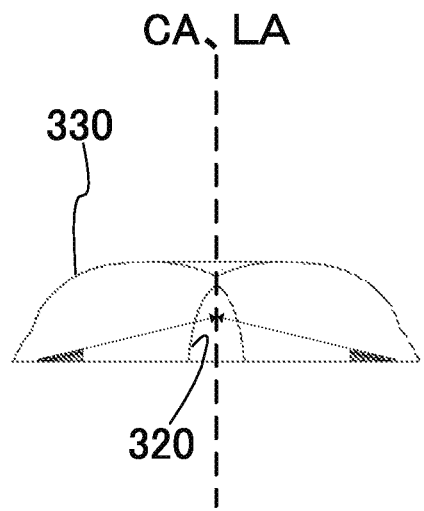
Figure 10C:
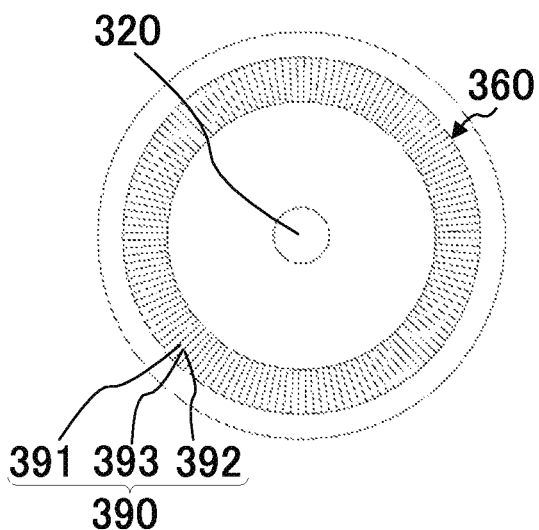
Figure 10D:
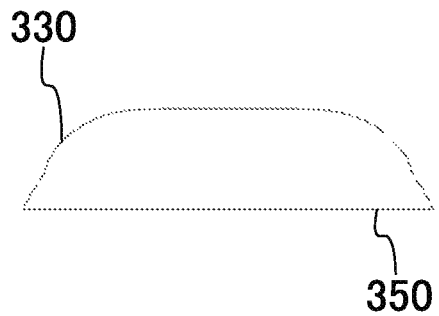

Note that, also in light flux controlling member 500 according to Embodiment 2, the plurality of ridges 390 (total reflection prism) may be formed in inclined surface 364. FIGS. 10A to 10D illustrate a configuration of light flux controlling member 600 according to Modification 1 of Embodiment 2 including the plurality of ridges 390. FIG. 10A is a plan view, FIG. 10B is a sectional view taken along line A-A of FIG. 10A, FIG. 10C is a bottom view, and FIG. 10D is a front view. In FIG. 10B, hatching is omitted. Light flux controlling member 600 according to Modification 1 of Embodiment 2 differs from Embodiment 2 only in that the plurality of ridges 390. In view of this, the same components as those of Embodiment 2 are denoted by the same reference numerals and the description thereof is omitted.

Illuminance Distribution in Surface Light Source Device

Figure 11A:
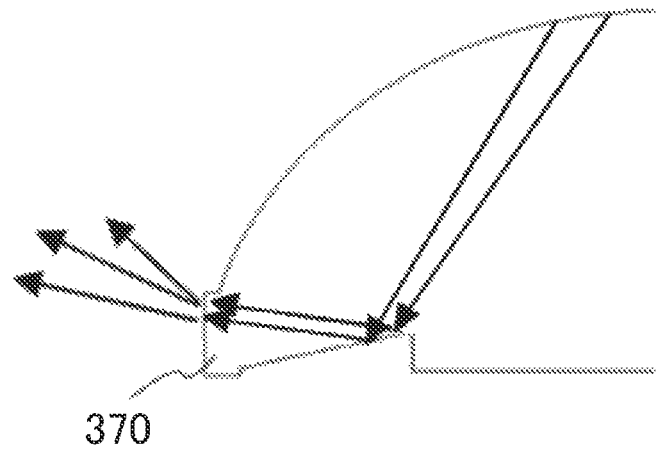
FIGS. 11A and 11B are diagrams for describing a configuration of the light flux controlling member according to Embodiment 2.
Figure 11B:
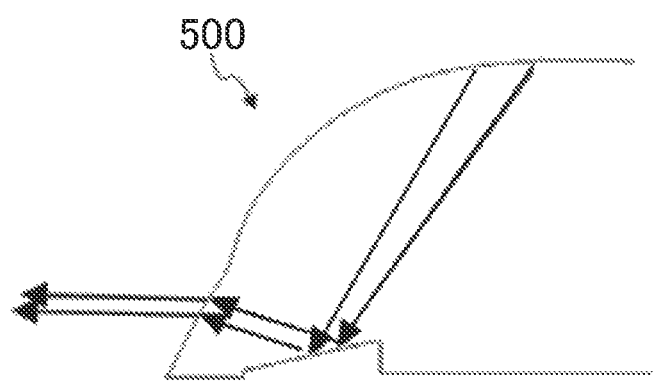

FIGS. 11A and 11B are diagrams for describing a difference between a known light flux controlling member including flange part 370 and light flux controlling member 500 according to Embodiment 2 in which flange part 370 is not provided.

As illustrated in FIG. 11A, in the known light flux controlling member, light incident on flange part 370 is emitted slightly upward while being slightly scattered because of flange part 370. On the other hand, as illustrated in FIG. 11B, in light flux controlling member 500, light travels straight and luminance unevenness is conceivably reduced because flange part 370 is not provided. Note that light flux controlling member 500 according to Embodiment 2 can be especially suitable for a case where a light-emitting element (e.g., COB light-emitting diode) that emits light from the top surface and the side surface is employed as light-emitting element 220.

The illuminance distribution was measured with a light-emitting device including light flux controlling member 500 according to Embodiment 2 illustrated in FIG. 9. In addition, for comparison, the illuminance distribution was measured also with a light-emitting device including a known light flux controlling member that does not include flange part 370.

In the present measurement, the parameters were set as follows.

Parameters

Figures 12A, 12B:
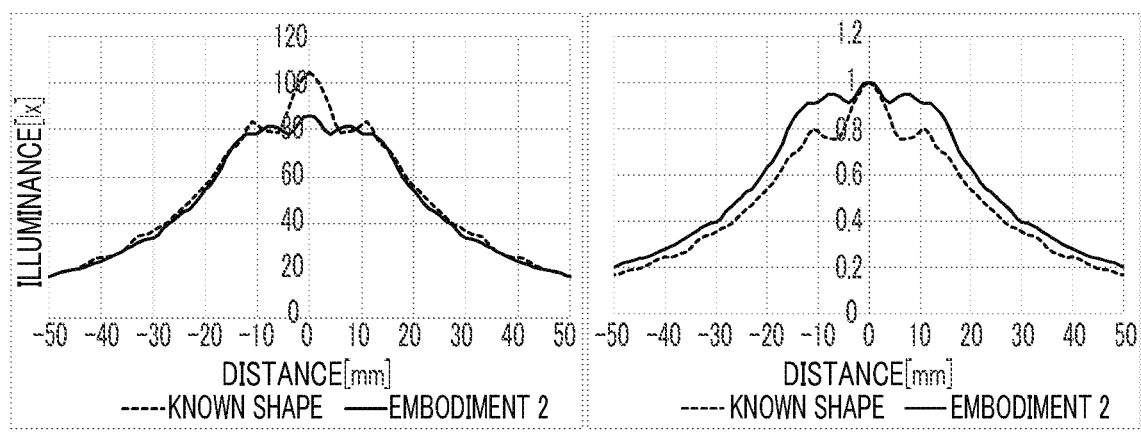
FIGS. 12A and 12B show results of a measurement of an illuminance distribution in one light-emitting device of a surface light source device according to Embodiment 2.

The length of each side of the light-emitting surface of light-emitting element 220: approximately 0.9 mm (diagonal length: approximately 1.3 mm The outer diameter of light flux controlling member 500: φ13 mm The diameter of the opening of recess 310 serving as incidence surface 320: φ4 mm The distance (optical distance OD) between light flux controlling member 500 and light diffusing member 120: approximately 3.6 mm FIGS. 12A and 12B show results of the measurement. The abscissa indicates the distance from central axis CA of light flux controlling member (light axis LA), and the ordinate indicates the illuminance FIG. 12A shows the illuminance distribution under the above-mentioned conditions. FIG. 12B shows a result of normalization for setting the illuminance to 1 in the case where the distance is 0 mm in the measurement result of FIG. 12A.

FIG. 12A shows that comparing the known light flux controlling member 30 with light flux controlling member 500 according to Embodiment 2, light flux controlling member 500 according to Embodiment 2 has a lower illuminance of the region around the part immediately above the light flux controlling member. In addition, FIG. 12B shows that comparing the known light flux controlling member 30 with light flux controlling member 500 according to Embodiment 2, light flux controlling member 300 according to Embodiment 2 has a more spread half-width of the illuminance, thus more significantly spreading the light.

In addition, comparing FIGS. 12A and 12B (Embodiment 2) with FIGS. 8A and 8B (Embodiment 1), the light is more significantly spread in FIGS. 12A and 12B. Conceivably, the light is more significantly spread because flange part 370 is not provided in light flux controlling member 500 according to Embodiment 2.

INDUSTRIAL APPLICABILITY

The light flux controlling member, the light-emitting device and the surface light source device of the embodiment of the present invention may be applied to a backlight of a liquid crystal display, a generally-used illumination apparatus and the like.

REFERENCE SIGNS LIST

100 Surface light source device
100' Display device

102 Display member (Illumination target member)
110 Housing
112 Bottom plate
114 Top plate
120 Light diffusing member
200 Light-emitting device
210 Substrate
220 Light-emitting element
30, 300, 400, 500, 600 Light flux controlling member
310 Recess
320 Incidence surface
33, 330 Emission surface
330a First emission surface
330b Second emission surface
330c Third emission surface
350 Rear surface
360 Reflection part
370 Flange part
380 Leg part
390 Ridge
391 First inclined surface
392 Second inclined surface
393 Ridgeline
45, 364 Inclined surface
CA Central axis
LA Optical axis

The invention claimed is:

1. A light flux controlling member for controlling a distribution of light emitted from a light-emitting element, the light flux controlling member comprising:
  an incidence surface disposed on a rear side of the light flux controlling member to intersect a central axis of the light flux controlling member, the incidence surface being configured to allow the light emitted from the light-emitting element to enter the light flux controlling member;
  an emission surface disposed on a front side of the light flux controlling member to intersect the central axis, the emission surface being configured to emit light entered from the incidence surface;
  a reflection part including an inclined surface disposed on the rear side of the light flux controlling member to surround the incidence surface, the inclined surface being configured to reflect, in a direction away from the central axis, light entered from the incidence surface and Fresnel-reflected by the emission surface; and
  a rear surface disposed on the rear side of the light flux controlling member,
  wherein in a cross-section including the central axis of the light flux controlling member, a region where light emitted from a light emission center of the light-emitting element that is entered from the incidence surface and sequentially reflected by the emission surface and the inclined surface reaches in the emission surface includes a portion where a derivative value of a gradient of a tangent to a given point in the emission surface is 0, or a portion where a sign of the derivative value reverses, in a direction from a highest point of the emission surface toward an outer edge of the emission surface,
  wherein the portion where derivative value of the gradient of the tangent to the given point in the emission surface is 0 is inclined with respect to the rear surface.

2. The light flux controlling member according to claim 1 further comprising:
  a flange part disposed between the outer edge of the emission surface and an outer edge of the rear surface and extended in the direction away from the central axis.

3. The light flux controlling member according to claim 1, wherein the emission surface and the rear surface of the light flux controlling member are connected to each other.

4. A light-emitting device comprising:
  a light-emitting element; and
  the light flux controlling member according to claim 1 disposed over the light-emitting element.

5. The light-emitting device according to claim 4, wherein the light-emitting element emits light from a top surface and a side surface.

6. A surface light source device comprising:
  the light-emitting device according to claim 4; and
  a diffusion plate configured to transmit light emitted from the light-emitting device while diffusing the light.

7. A display device comprising:
  the surface light source device according to claim 6; and
  a display member configured to be illuminated with light emitted from the surface light source device.

* * * * *